United States Patent [19]
Sumner et al.

[11] 3,773,419
[45] Nov. 20, 1973

[54] FACSIMILE AND MICROFILM APPARATUS

[76] Inventors: Frank L. Sumner, 15711 E. Alta Vista Way, San Jose, Calif. 95127; Ted B. Slater, 1456 Lincoln Ave., San Jose, Calif. 95125

[22] Filed: Aug. 9, 1971

[21] Appl. No.: 169,969

[52] U.S. Cl.......................... 355/43, 355/46, 355/66
[51] Int. Cl.......................................................... G03b
[58] Field of Search .................... 355/43, 46, 65, 66

[56] References Cited
UNITED STATES PATENTS
3,584,949   6/1971   Clow.................................... 355/66

*Primary Examiner*—Samuel S. Matthews
*Assistant Examiner*—Richard A. Wintercorn
*Attorney*—Leslie M. Hansen et al.

[57] ABSTRACT

The disclosed embodiment of the present invention is a facsimile and microfilm apparatus for simultaneously recording photographically on a strip of microfilm and a strip of photosensitive paper. A beam splitter is employed for projecting an image from an object plane onto a strip of photosensitive paper at an image plane. An optical system and film drive system mounted behind the beam splitter is employed with a shutter as a microfilm camera and with an illumination source as a microfilm projector. When employed as a camera, the photosensitive paper forms an object plane for photographically recording an image of the original object on microfilm. When employed as a projector, the photosensitive paper forms an image plane for recording the information contained on the developed film strip onto the photosensitive paper. A second beam splitter mounted in front of the projector is employed for viewing the film strip through an eyepiece so that the operator can select the appropriate frame on the film strip.

10 Claims, 3 Drawing Figures

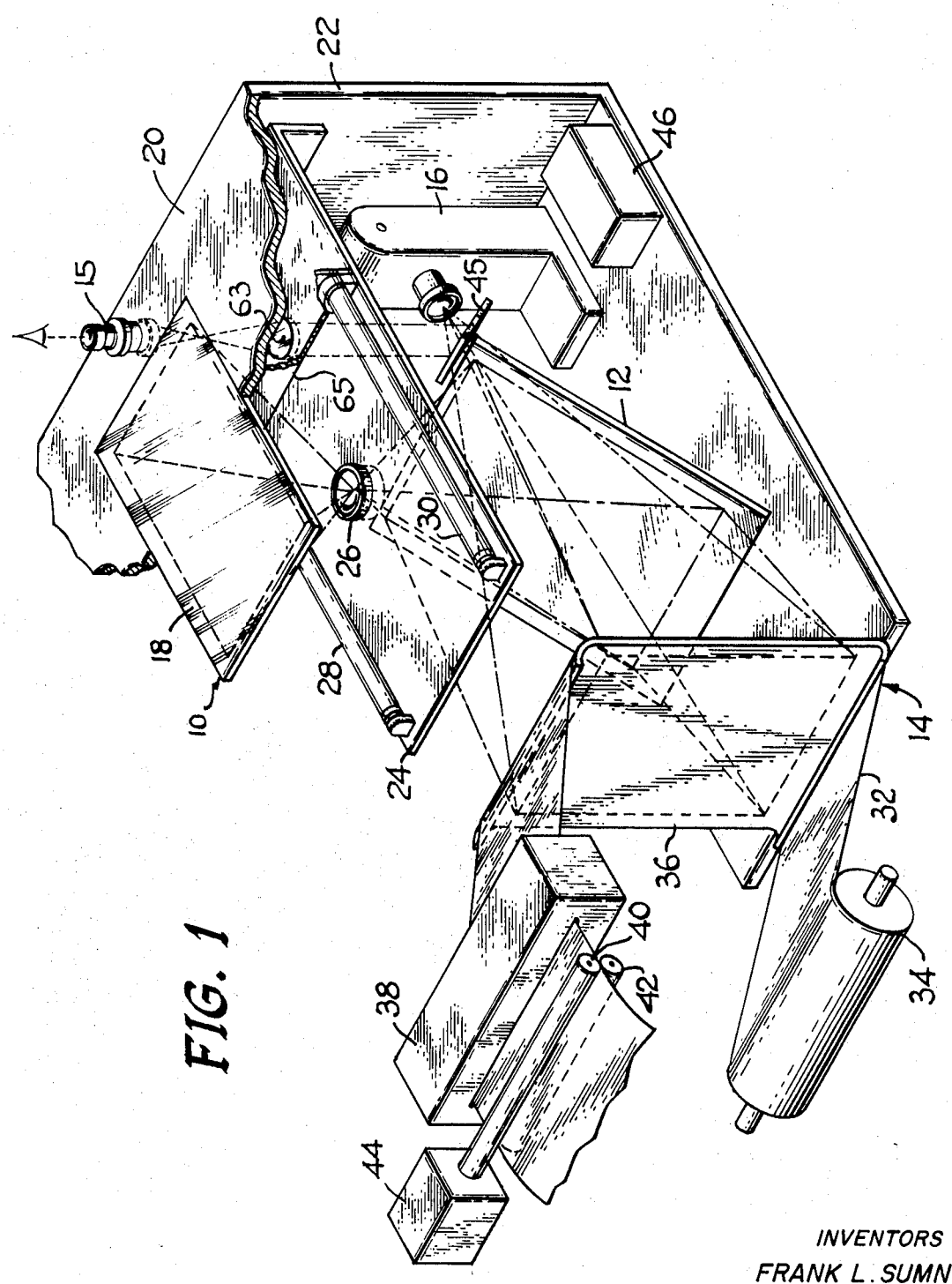

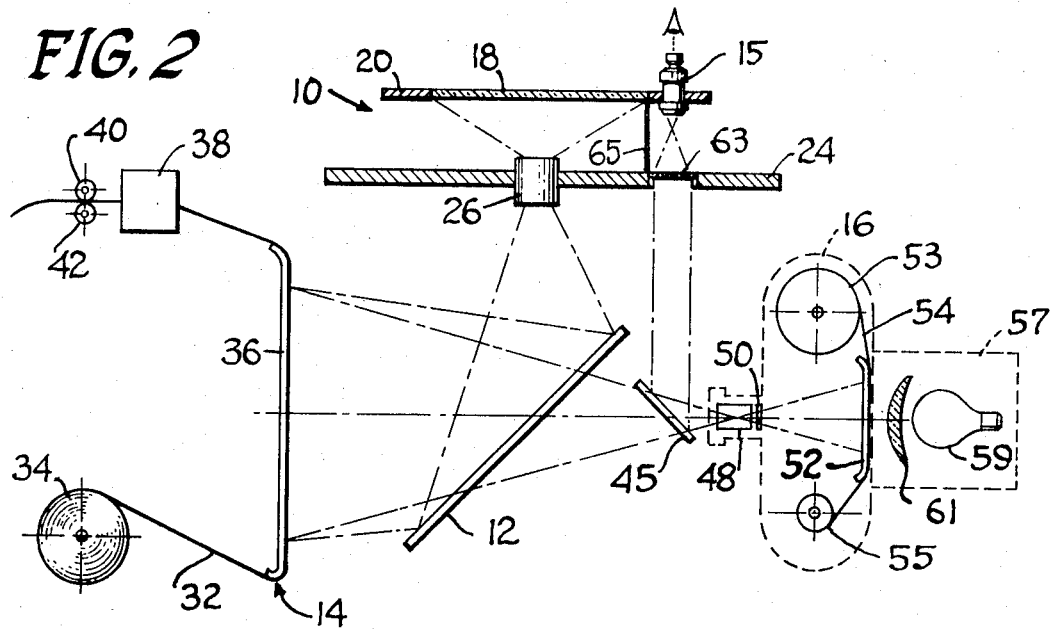

FACSIMILE AND MICROFILM APPARATUS

BACKGROUND

This invention relates generally to a facsimile and microfilm apparatus, and more particularly to an apparatus for simultaneously recording photographically on a strip of microfilm and a strip of photosensitive paper, and for recording from a strip of processed microfilm onto a strip of photosensitive paper.

A need has long existed for an apparatus which is capable of simultaneously recording the image of an object on hard copy, such as photosensitive paper, and on microfilm. It has become a dominant practice in many business enterprises to make copies of documents for distribution and the like on facsimile machines. A large number of business enterprises and firms also have a requirement for recording documents on microfilm for storage purposes. Quite often, the same documentation is reproduced on hard copy and also stored on microfilm. It has been the practice in the past to provide separate facilities for reproducing documentation on hard copy and for microfilming. Such use of separate facilities for performing these tasks involves a larger capital outlay for equipment. In addition, the time involved in performing these tasks separately is understandably greater than the amount of time required to perform these tasks simultaneously. Accordingly, such use of separate facilities for performing these individual tasks involves a greater cost to the user thereof.

If microfilm is employed as a storage media, a microfilm printer is required to produce hard copy reproductions of documents recorded thereon. This requirement for a microfilm printer increases the capital outlay which is necessary for a complete microfilm service. However, a microfilm printer employs many of the same optical and mechanical components used in facsimile devices and microfilming devices. If these components can be employed to perform all of the above mentioned functions in one facility, the capital outlay required can be drastically reduced.

In many business enterprises and firms a number of their personnel have free access to their reproduction facilities. Such free access promotes the use of such facilities for personal enjoyment, thereby resulting in increased costs to the employer. As a result, many enterprises and firms have a need for maintaining surveillance of the documentation being reproduced on their equipment by personnel having free access thereto.

STATEMENT OF THE INVENTION

Accordingly, a primary object of the present invention is to provide a combination facsimile and microfilm apparatus which is capable of simultaneously recording photographically on a strip of microfilm and on a strip of photosensitive paper the image of an object, such as a document.

Another object of the present invention is to provide a combination facsimile and microfilm apparatus which, in addition to the above mentioned functions, is capable of recording photographically on a strip of photosensitive paper an image recorded on a microfilm.

A feature of the present invention resides in the provision of means for selectively microfilming certain ones of the objects which are being reproduced or copied.

A further feature of the present invention resides in the provision of means for disabling either one of the functions of a combination facsimile and microfilm apparatus to permit separate operation of the device either as a facsimile machine or as a microfilm camera.

A distinct advantage is realized from a unique combination of a facsimile machine and microfilm apparatus, constructed in accordance with the principles of the present invention, for simultaneously recording photographically on a strip of microfilm and on a strip of photosensitive paper.

Another advantage which can be realize from the apparatus of the present invention is that the same optical and mechanical components used for the facsimile and microfilming functions are also employed for recording photographically on a strip of photosensitive paper from a processed strip of microfilm.

These and other objects, features and advantages of the present invention will be more fully realized and understood from the following detailed description, when taken into conjunction with the accompanying drawings, wherein:

FIG. 1 is a perspective view of a ficsimile machine and microfilm apparatus constructed in accordance with the principles of the present invention;

FIG. 2 is a diagrammatic view illustrating the optical arrangement of the various elements of the present invention; and FIG. 3 is a block diagram of the control system employed in conjunction with the apparatus illustrated in FIGS. 1 and 2.

Like reference numerals throughout the various views of the drawings are intended to designate the same or similar elements.

GENERAL DESCRIPTION

With reference to FIG. 1, there is shown a viewing station, generally designated with the reference numeral 10 for receiving a document, the image of which is projected by means of a beam splitter 12 to a reproduction station, generally designated with a reference numeral 14. The reproduction station 14 produces a hard copy output having an image of the object which is positioned at the viewing station 10. A microfilm transport and associated optics, generally designated with the reference numeral 16, is mounted for viewing the image imposed on the reproduction station 14 and for exposing a frame of film with that image. The same transport and optics is also employed for projecting an image from a processed strip of microfilm onto an image plane at the reproduction station 14. The frame which is being projected on the microfilm can be viewed by an operator through an eyepiece 15 for selecting the correct frame for producing a hard copy output.

DETAILED DESCRIPTION

With reference to FIG. 1 in greater detail, the viewing station 10 is formed of a glass plate 18 which is disposed for supporting an object, such as a document, thereby forming an object plane. The glass plate 18 is mounted in a top surface 20 of a cabinet 22. Only the supporting members of the cabinet 22 are shown for purposes of better illustration, but it is to be understood that the cabinet 22 forms an enclosure for eliminating stray light from entering therein, except for that portion which includes the glass plate 18. A plate 24 divides the cabinet 22 into two section.

Plate 24 supports a lens 26 for projecting an image from the object plane onto the beam splitter 12. The lens 26 forms the only light transmission path between the two sections of the cabinet 22 defined by the plate 24. A pair of light sources 28 and 30 are mounted on the plate 24 and are disposed for illuminating an object supported on the glass plate 18.

The light reflected from the object supported on the glass plate 18 is projected by means of the lens 26 and beam splitter 12 onto a strip of photosensitive paper 32 in the reproduction station 14. Photosensitive paper 32 extends from a supply roll 34 over the surface of a plate 36 and to a developing station 38. That portion of the photosensitive paper 32 which is positioned on the plate 36 forms an image plane which is exposed with an image projected from an object supported on the glass plate 18. A pair of rollers 40 and 42 are driven by means of a drive mechanism 44, such as a motor, to pull the photosensitive paper 32 through the developing station 38 and to deposit a print at an output station of the apparatus.

When an image has been projected onto the image plane defined by the plate 36, microfilm apparatus 16 may be activated to record that image. A control unit 46 applies appropriate signals to the camera 16, the lights 28 and 30, and the drive mechanism 44 to perform the various tasks of these components in proper time sequence, as will be explained in greater detail hereinbelow. It will be noted that apparatus 16 does not view the object directly, but rather views a projected image of that object. In essence, therefore, the image plane defined by the plate 36 forms an object plane for the image recorded by apparatus 16. Apparatus 16 can also be activated to project an image recorded on a strip of microfilm onto the photosensitive paper 32 at the object plane. In order for the operator to ascertain the correct frame on the strip of microfilm to be projected and reproduced, a beam splitter 45 is mounted in the optical path to project an image thereof through eyepiece 15 for viewing by the operator. If desired, the beam splitter 45 may be replaced by a rotatable mirror which can be rotated out of the optical path after the image has been viewed by the operator to permit projection of the image onto the photosensitive paper 32. The optical arrangement and details of apparatus 16 will be better understood from FIG. 2 of the drawings.

As shown by the phantom lines in FIG. 2, the image of an object supported on glass plate 18 is projected by lens 26 via the beam splitter 12 to an image plane defined by the plate 36. At this image plane, a portion of photosensitive paper 32 is exposed and subsequently developed by developing unit 38. Simultaneously with the exposure of the photosensitive paper 32, apparatus 16 is activated to record the image projected onto the photosensitive paper 32.

Apparatus 16 is provided with a lens element 48, a shutter 50 and an apertured plate 52 which forms a support for a portion of a film strip 54, as well as an image plane. The object plane for the camera system is that surface of the photosensitive paper 32 which is supported on the plate 36. Film strip 54 is mounted on a pair of reels 53 and 55 and advanced through the film gate which included the aperture plate 52 by appropriate drive means capable of advancing the film either one frame at a time or at a relatively rapid rate, if desired. Such drive mechanisms for film transports are well-known in the art.

These same film advance mechanisms in the apparatus 16 and the lens element 48 are also employed for transporting a processed film strip and projecting an image thereof through beam splitter 45 and beam splitter 12 onto the photosensitive paper 32 for recording an image thereon. When the apparatus 16 is employed as a microfilm projector, an illumination source 57, which includes a lamp 59 and a condenser lens 61, is activated to project an image recorded on the film strip 54 through the lens element 48 and onto the photosensitive paper 32. The correct frame for projection can be viewed by an operator observing the film strip by means of the eyepiece 15 and beam splitter 45. A portion of the projected light from the film strip is reflected toward the eyepiece 15 by means of the beam splitter 45 and passes through a window 63 in the plate 24. As shown in FIG. 1, a wall 65 separates the area above the plate 24 which includes the lens element 26 from the area above the plate 24 which includes the window 63. If it is desired to view the microfilm through the eyepiece 15 without exposing the photosensitive paper 32 until the correct frame is found, the beam splitter 45 may be replaced by a mirror which is mounted for rotation at one end thereof out of the optical path between the apparatus 16 and the reproduction station 14.

FIG. 3 illustrates a block diagram of a typical control system for supplying control signals to the active components of the apparatus illustrated in FIG. 1. As shown therein, the operation of a timer 56 is initiated upon the closure of a switch 58 by the operator of the apparatus. One output of the timer 56 is connected through a switch 60 to a camera advance mechanism 62 to advance the film 54 one frame. This same control signal is supplied through a delay 64 to a shutter control mechanism 66 to actuate the shutter 50 and permit the transmission of light through the camera to expose the film 54. Delay 64 permits the film to be advanced prior to exposure of the film 54. Switch 60 is closed during the mode of operation in which each object being reproduced is also to be microfilmed. A second output of the timer 56 is supplied to lights 28 and 30. This control signal is delayed in time from the control signal supplied to the camera advance mechanism 62, but is advanced in time from the output of the delay 64. A third output of the timer 56 is supplied to the paper drive mechanism 44 upon the termination of the control signal supplied to the light sources 28 and 30.

If it is desired to employ the microfilm apparatus 16 as a surveillance recorder, switch 60 is open and a counter 68 is enabled. For example, if every fifth document to be reproduced on hard copy is to be microfilmed, the counter 68 provides an output upon the application of five control signals at an input thereof. The output of counter 68 is supplied to the camera advance mechanism 62 and through the delay 64 to the shutter mechanism 66. The counter 68 is enabled by he closure of a switch 70.

A switch 72 is provided for disabling the paper drive mechanism 44 when it is open. Accordingly, if it is desired to employ the apparatus illustrated in FIG. 1 as a microfilming device without producing any hard copy reproductions, the paper drive mechanism 44 is disabled by opening the switch 72. If, on the other hand, it is desired to employ the apparatus as a reproduction machine without the microfilming function, both switches 60 and 70 are open and switch 72 is closed.

Switch 74 is connected to activate the illumination source 57 and the shutter 66. If it is desired to employ the apparatus as a microfilm printer, switches 60, 70 and 72 are open and switch 74 is closed to activate the source 57 and the shutter 66 to permit the projection of any image from the film 54 onto the photosensitive paper 32. Camera advance mechanism 62 may be activated by separate means (not shown) to advance the film during the selection process by an operator.

It is to be understood, of course, that various types of control systems can be employed in conjunction with the apparatus illustrated in FIG. 1 and that the control system illustrated in FIG. 3 is only illustrated of one type of control system which can be employed. It will also be appreciated that the optical arrangement illustrated in FIGS. 1 and 2 provide the unique combination of components which require relatively little space to perform the desired functions. That is, by employing the apparatus 16 in such a manner that it views the image plane formed by the photosensitive paper 32 rather than the object directly, the resultant optical arrangement is more compact. Furthermore, by employing the same optical components and transport mechanisms for the two functions, including exposure of a microfilm and projection thereof, a considerable amount of savings is realized.

The invention claimed is:

1. A facsimile and microfilm apparatus comprising
   a. means forming an object plane,
   b. means forming a first image plane,
   c. a beam splitter disposed between the object plane and the first image plane,
   d. first means for projecting via said beam splitter the image on the object plane onto the first image plane,
   e. means forming a second image plane, and
   f. means for projecting via said beam splitter the image on the first image plane onto the second image plane.

2. A facsimile and microfilm apparatus as defined in claim 1, further comprising means for transporting a film strip through the second image plane.

3. A facsimile and microfilm apparatus as defined in claim 1, further comprising means for transporting a photosensitive paper through said first image plane.

4. A facsimile and microfilm apparatus as defined in claim 3, further comprising means for transporting a film strip through the second image plane.

5. A facsimile and microfilm apparatus as defined in claim 4, further comprising means for illuminating said object plane, and means synchronized with said illuminating means for advancing each of said transporting means.

6. A facsimile and microfilm apparatus as defined in claim 1, further comprising means for selectively energizing said projecting means.

7. A facsimile and microfilm apparatus as defined in claim 1, wherein said second projecting means is further disposed for projecting the image on the second image plane onto the first image plane.

8. A facsimile and microfilm apparatus as defined in claim 7, further comprising means for viewing the second image plane.

9. A facsimile and microfilm apparatus as defined in claim 7, further comprising means for illuminating the second image plane.

10. A facsimile and microfilm apparatus as defined in claim 7, further comprising means for transporting a film strip through the second image plane.

* * * * *